US009613183B2

(12) United States Patent
Dean (10) Patent No.: US 9,613,183 B2
(45) Date of Patent: Apr. 4, 2017

(54) POST-AUTHORIZATION TRANSACTION BUNDLING CONTROL (71) Applicant: David Bradley Dean, Frisco, TX (US)

(72) Inventor: David Bradley Dean, Frisco, TX (US)

(73) Assignee: DATAVI, LLC, Plano, TX (US)

( * ) Notice: Subject to any disclaimer, the term of this patent is extended or adjusted under 35 U.S.C. 154(b) by 617 days.

(21) Appl. No.: 13/764,319

(22) Filed: Feb. 11, 2013

(65) Prior Publication Data

US 2014/0229189 A1  Aug. 14, 2014

(51) Int. Cl.
G06Q 40/00 (2012.01)
G06F 19/00 (2011.01)
G06Q 50/22 (2012.01)
G06Q 40/08 (2012.01)

(52) U.S. Cl.
CPC ........... *G06F 19/328* (2013.01); *G06Q 40/08* (2013.01); *G06Q 50/22* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| 4,491,725 | A | 1/1985 | Pritchard |
| 7,072,842 | B2 | 7/2006 | Provost et al. |
| 7,246,068 | B2 | 7/2007 | Thomas, Jr. |
| 7,792,686 | B2 | 9/2010 | Allen |
| 7,922,083 | B2 | 4/2011 | Harrison et al. |
| 7,991,694 | B2 * | 8/2011 | Takayama ....................... 705/41 |
| 8,412,625 | B2 * | 4/2013 | Pilo' ............................... 705/39 |
| 8,571,937 | B2 * | 10/2013 | Rose et al. ....................... 705/16 |
| 2005/0228700 | A1 | 10/2005 | Barcomb |
| 2006/0047764 | A1 * | 3/2006 | Enekiel ......................... 709/206 |
| 2007/0005402 | A1 | 1/2007 | Kennedy et al. |
| 2007/0083399 | A1 | 4/2007 | Bryan |
| 2007/0185800 | A1 | 8/2007 | Harrison et al. |
| 2008/0133266 | A1 | 6/2008 | Allen |
| 2009/0125428 | A1 * | 5/2009 | Conklin et al. ................. 705/35 |
| 2010/0049654 | A1 * | 2/2010 | Pilo .............................. 705/43 |
| 2010/0138324 | A1 | 6/2010 | Allen |
| 2010/0205078 | A1 | 8/2010 | Lawrence et al. |
| 2012/0253852 | A1 * | 10/2012 | Pourfallah et al. ............... 705/4 |
| 2013/0006672 | A1 | 1/2013 | Dang |
| 2014/0344156 | A1 * | 11/2014 | Hilt et al. ....................... 705/44 |
| 2014/0379361 | A1 * | 12/2014 | Mahadkar et al. ............... 705/2 |

* cited by examiner

*Primary Examiner* — Frantzy Poinvil (57) ABSTRACT

A data processing control comprising an outgoing payment request control object having 1) user-selectable data records, each user-selectable data record having one or more associated fields, 2) graphical attributes to allow the user-selectable data records to be displayed, and 3) functional attributes to allow the user-selectable data records to be submitted for payment authorization by a third party. An incoming authorized payment control object having 1) authorized payment data records, each of the authorized payment data records having one or more associated fields, 2) graphical attributes to allow the authorized payment data records to be displayed, and 3) functional attributes to allow the authorized payment data records to be submitted for fund transfer in a single bundled payment transaction. The outgoing payment request control object and the incoming authorized payment control object are generated in a user interface for a healthcare services provider.

4 Claims, 6 Drawing Sheets

POST-AUTHORIZATION TRANSACTION BUNDLING CONTROL

FIELD OF THE INVENTION

The invention relates to transaction processing, and more particularly to a post-authorization transaction bundling control, apparatus and method for bundling approved transactions, such as prior to transfer of funds.

BACKGROUND OF THE INVENTION

Processing of claims for medical services is presently performed in batch mode, and is typically outsourced by insurance companies to third parties that are responsible for printing and mailing checks to medical service providers, and for mailing an explanation of benefits (EOB) to the insured party.

SUMMARY OF THE INVENTION

In one exemplary embodiment, a data processing control is provided that includes an outgoing payment request control object having 1) user-selectable data records, each user-selectable data record having one or more associated fields, 2) graphical attributes to allow the user-selectable data records to be displayed, and 3) functional attributes to allow the user-selectable data records to be submitted for payment authorization by a third party. An incoming authorized payment control object having 1) authorized payment data records, each of the authorized payment data records having one or more associated fields, 2) graphical attributes to allow the authorized payment data records to be displayed, and 3) functional attributes to allow the authorized payment data records to be submitted for fund transfer in a single bundled payment transaction. The outgoing payment request control object and the incoming authorized payment control object are generated in a user interface for a healthcare services provider. Other exemplary embodiments are disclosed in greater detail herein.

DETAILED DESCRIPTION OF PREFERRED EMBODIMENTS

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

Figure 1:
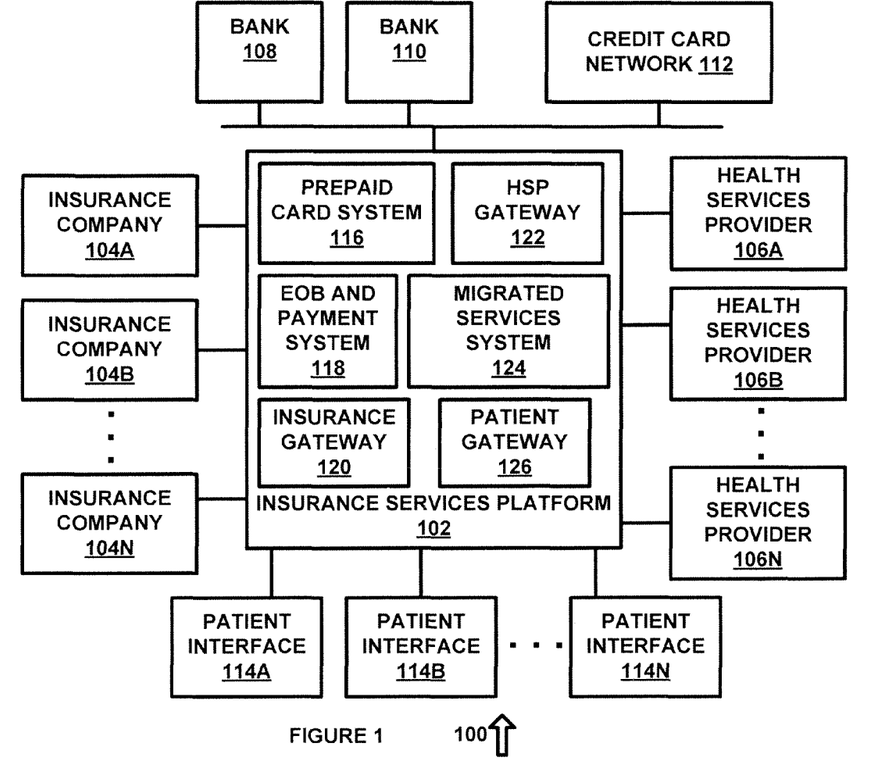
FIG. 1 is a diagram of a system for a hybrid prepaid and closed loop payment process for health services providers in accordance with an exemplary embodiment of the present invention.

FIG. 1 is a diagram of a system 100 for a hybrid prepaid and closed loop payment process for health services providers in accordance with an exemplary embodiment of the present invention. System 100 includes insurance services platform 102, which can be implemented in hardware or a suitable combination of hardware and software. As used herein and by way of example and not by limitation, "hardware" can include a combination of discrete components, an integrated circuit, an application-specific integrated circuit, a field programmable gate array, a general purpose processing or server platform, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Insurance services platform 102 is coupled to insurance companies 104A through 104N, health services providers 106A through 106N, patient interfaces 114A through 114N, bank 108, bank 110 and credit card network 112 through a suitable communications medium. Each of these separate system components can be implemented in hardware or a suitable combination of hardware and software, and can be one or more software systems operating on a general purpose processing platform, a server platform, or other suitable platforms. As used herein, a communications medium can include a wire line communications medium, a wireless communications medium, an optical communications medium, an analog communications medium, a digital communications medium, other suitable communications media or a suitable combination of communications media. As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), or other suitable connections. In one exemplary embodiment, a communications medium can be a network or other suitable communications media.

In addition, insurance services platform 102 includes prepaid card system 116, EOB and payment system 118, insurance gateway 120, HSP gateway 122, migrated services system 124, and patient gateway 126. Insurance services platform 102 provides payment for health service providers, a patient interface for insurance service providers, and other suitable functionality. In one exemplary embodiment, insurance services platform 102 can be used to coordinate payments to health service providers for health services provided to patients using a prepaid card instead of checks. In this exemplary embodiment, the use of a prepaid card allows a health services provider to be electronically notified of an available payment by an insurance company or other suitable parties, so that the health services provider can coordinate the transfer of funds using the prepaid card through their existing card services payment provider. In another exemplary embodiment, system 100 can be used for closed loop processing, such as to allow health service providers to obtain payments from insurance companies using the Automated Clearing House (ACH) network or other bank networks. Likewise, migration between the prepaid card functionality and the closed loop system processing functionality is provided by system 100, such as to allow health services providers to migrate from an electronic prepaid card electronic account to an electronic closed loop electronic account. As used herein, an electronic account can be implemented using suitable database tools and interface tools to define a set of data associated with an entity and to allow data to be selectively stored, retrieved and modified in predetermined electronic data fields associated with the electronic account, or other suitable system and processes can also or alternatively be used.

Insurance companies 104A through 104N can be insurance company data processing systems that provide data that is used to generate explanations of benefits, that receive requests from health service providers for authorization to perform health services, that receive requests for payment from health service providers for health care services that have been authorized and provided to insured parties, or that provide other suitable functions. In one exemplary embodiment, insurance companies 104A through 104N can be existing insurance company data processing systems that provide payments and explanations of benefits data in electronic data interchange (EDI) form to third-party processors for paper transaction processing or other suitable transaction processing, as suitably modified to be used in conjunction with system 100. It is also noted that the terms "authorization" and "settlement" can refer to both a health service provider's request for authorization to provide services to a patient and settlement of the charges for those services, as well as authorization and settlement of fund transfers, depending on the context used.

Health services providers 106A through 106N can be one or more data processing systems associated with health service providers such as doctors, doctor practice groups, hospitals, or other health service providers, such as data processing systems that receive patient information, contact insurance companies for authorization, approval, and information such as co-pay amounts, that submit requests for payment of services under a patient's insurance contract with the insurance company, and that perform other suitable functions. In one exemplary embodiment, health services providers 106A through 106N may be configured to interface directly with insurance companies 104A through 104N through various individual gateways with each insurance company, using paper forms, or in other suitable manners, and may also or alternatively interface with insurance services platform 102.

Patient interfaces 114A through 114N allow patients to interface with their insurance companies 104A through 104N and health services providers 106A through 106N through insurance services platform 102. In this manner, patients can receive an explanation of benefits or other suitable data from an insurance company, can receive messaging from health services providers, or can otherwise contact or be contacted by the insurance companies or health service providers as needed.

Bank 108 and bank 110 provide banking functions for closed prepaid card system processing. In one exemplary embodiment, a bank may be required to act as a sponsor in order to access credit card network 112 to provide for prepaid card system 116 functionality. In addition, bank 108 and bank 110 are coupled through the ACH to provide for transfers of funds between electronic accounts at each institution. System 100 allows inter-bank and intra-bank fund transfers to be performed as needed, using the ACH network or in other suitable manners. Different banking account structures can also be implemented using system 100. In on exemplary embodiment, insurance services platform 102 can have a bank account that is used to hold funds in trust for insurance companies 104A through 104N and health services providers 106A through 106N, where money is transferred from the bank account of insurance services platform 102 to bank accounts for insurance companies 104A through 104N and health services providers 106A through 106N as part of a settlement and authorization process. Likewise, insurance services platform 102 can generate paper checks, can use a credit card network such as Visa or MasterCard, or other suitable processes can be used to transfer funds between the bank accounts of the insurance companies, insurance services platform 102 and health services providers.

Prepaid card system 116 allows insurance services platform 102 to issue prepaid cards to health services providers 106A through 106N for each of insurance companies 104A through 104N. In one exemplary embodiment, each health services provider 106A through 106N can receive a single prepaid card which can be funded from any of insurance companies 104A through 104N. In another exemplary embodiment, each insurance company 104A through 104N can provide each health services provider 106A through 106N with a different prepaid card. Other suitable configurations can also or alternatively be used.

EOB and payment system 118 allows insurance companies 104A through 104N to provide explanations of benefits and payment data to insurance services platform 102. EOB and payment system 118 can also determine whether any of health services providers 106A through 106N should receive EOB data and payments, whether patient interfaces 114A through 114N are configured to receive electronic EOB data, and can perform other suitable functions. In one exemplary embodiment, insurance services platform 102 or EOB and payment system 118 can be configured to provide a notice to insurance companies 104A through 104N that the health services provider or patient interface is not available for an explanation of benefits or payment for a claim. In another exemplary embodiment, insurance services platform 102 can contact health services providers 106A through 106N or patient interfaces 114A through 114N in response to receiving EOB and payment data from insurance companies 104A through 104N, or can provide other suitable functions.

Insurance gateway 120 allows insurance companies 104A through 104N to access data stored on insurance services platform 102. In one exemplary embodiment, insurance gateway 120 allows an insurance company to dispute a charge from a health services provider, to communicate with a health services provider, to respond to queries from patients submitted through patient interfaces 114A through 114N, or to provide other suitable services. Insurance gateway 120 also receives EOB data files, EDI data files, or other suitable data files and generates account data for health services providers and patients. In one exemplary embodiment, the EOB data files and EDI data files can include predetermined data fields that are used to identify health services providers, patients and other parties, such as name fields, account number fields, address fields, social security number fields, telephone number fields and other suitable fields. In order to facilitate the creation of either a prepaid services account or a closed loop account, insurance gateway 120 can use these data fields to automatically generate account data is accounts for patients, health service providers or other suitable parties are determined not to exist when the EOB data files, EDI data files or other suitable data files are received from the insurance company.

HSP gateway 122 provides a gateway for health services providers 106A through 106N to interface with insurance services platform 102. In one exemplary embodiment, HSP gateway 122 allows health services providers 106A through 106N to submit claims for authorization or settlement to insurance companies 104A through 104N, can allow health services providers 106A through 106N to request payment from a prepaid card, or can provide other suitable services.

Migrated services system 124 allows health services providers 106A through 106N to migrate from prepaid card system 116 to a closed loop authorization and settlement system. In this exemplary embodiment, a closed loop system allows insurance services platform 102 to handle all payment authorization and settlement processes, such as to allow health services providers 106A through 106N to submit claims to insurance companies 104A through 104N for authorization, to submit claims to insurance companies 104A through 104N for payment after provision of services, to address any questions or disputes that insurance companies 104A through 104N may have with claims submitted by health services providers 106A through 106N, or to provide other suitable functions.

Patient gateway 126 allows patients through patient interfaces 114A through 114N to access explanation of benefits data, payment data, other suitable data. In one exemplary embodiment, patient gateway 126 can allow patients to coordinate a flexible spending program electronic account at bank 108 or bank 110 for payment of co-pays, can allow patients to register for reimbursement of out-of-pocket co-pays paid to health services providers 106A through 106N, can allow health services providers 106A through 106N to receive co-pays from flexible spending electronic accounts for patients through bank 108 or 110, or can provide other suitable functionality.

In operation, system 100 provides an integrated insurance platform or switch to allow health services providers, insurance companies, and patients to interface through a single switch platform. In one exemplary embodiment, system 100 allows health services providers to be initially approached to receive payments using a prepaid card through the credit card network 112 instead of individual checks or groups of checks for processed EOB statements from insurance companies 104A through 104N. In this exemplary embodiment, health services providers 106A through 106N can be provided with an incentive for switching from a paper check system to the prepaid card system, namely, to receive faster payment. Likewise, health services providers 106A through 106N can migrate to a closed loop system that is managed on insurance services platform 102, where bank accounts held by insurance companies 104A through 104N and health services providers 106A through 106N are accessed via the ACH based on rules managed by insurance services platform 102. In this exemplary embodiment, insurance services platform 102 provides closed loop processing in the form of authorization, settlement, and dispute processing, similar to the credit card network 112, but without the additional fees charged by credit card network 112.

Figure 2:
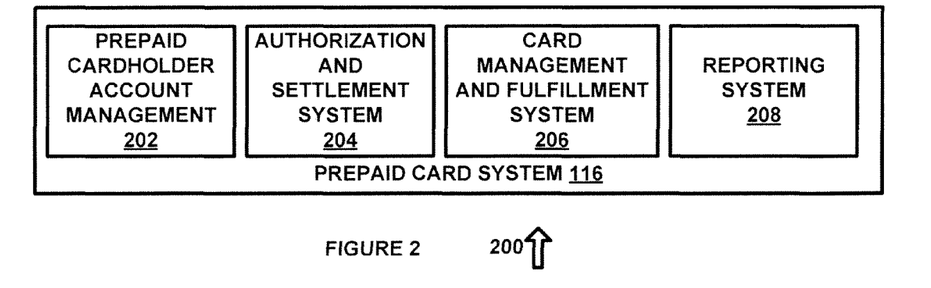
FIG. 2 is a diagram of a system for a prepaid card system in accordance with an exemplary embodiment of the present invention.

FIG. 2 is a diagram of a system 200 for a prepaid card system in accordance with an exemplary embodiment of the present invention. System 200 includes prepaid card system 116 and prepaid cardholder account management 202, authorization and settlement system 204, card management and fulfillment system 206 and reporting system 208, each of which can be implemented in hardware or a suitable combination of hardware and software, and which can be one or more software systems operating on a general purpose processing or server platform. In one exemplary embodiment, system 200 can be implemented as one or more user controls operating on a user interface device, such as a graphic user interface operating on a display device of a general purpose computing platform or other suitable computing platform, a touch screen interface, or other suitable interface devices.

Prepaid cardholder account management 202 allows prepaid cardholder electronic accounts to be managed by insurance services platform 102 or other suitable systems. In one exemplary embodiment, each health services provider 106A through 106N may receive a prepaid card, and payments made by an insurance company to their prepaid card can be coordinated through prepaid cardholder account management 202. In another exemplary embodiment, prepaid cardholder account management 202 can have electronic accounts for insurance companies 104A through 104N, and can coordinate payments to health services providers 106A through 106N, such as by issuing each of health services providers 106A through 106N a different prepaid card for insurance companies 104A through 104N or in other suitable manners. In another exemplary embodiment, prepaid cardholder account management 202 can provide a user interface control for selection of activation, processing, deactivation or other account features for prepaid cardholder account management, such as by using one or more objects having graphical, data and operational attributes, where the functional components of prepaid cardholder account management 202 are controlled by a user through interactions with the one or more objects.

Authorization and settlement system 204 allows a health services provider 106A through 106N to use a prepaid card to obtain electronic authorization and settlement of amounts due to the health services provider by the insurance company. In one exemplary embodiment, an insurance company can provide an EDI data file that includes an authorization request for authorization of a payment to a health services provider, or can submit the authorization request in other suitable manners. Authorization and settlement system 204 can extract the authorization request from the EDI data file and can verify that funds are available in the insurance company's account, and can generate a suitable notification such as an authorization number that is inserted into an EDI 835 file if funds are available and transferred from the insurance company's account to a health service provider's account, such as on a daily basis, using an automated clearinghouse process in conjunction with an originating depository financial institution. Authorization and settlement system 204 can generate a notification to the insurance company if funds are unavailable. Health services provider 106A through 106N can receive an electronic notification that a payment has been authorized for one or more claims made for services provided to patients. Authorization and settlement system 204 can transmit the electronic notification, and can then receive electronically-read card-swipe data and other suitable data from the health services provider 106a credit card terminal, such as by using an existing prepaid card over credit card network 112 or in other suitable manners, so as to perform settlement of the transaction. Authorization and settlement system 204 can then transmit an electronic notification of settlement to the insurance company and can perform other suitable processes. In another exemplary embodiment, authorization and settlement system 204 can provide a user interface control for selection of activation, processing, deactivation or other account features for authorization and settlement, such as by using one or more objects having graphical, data and operational attributes, where the functional components of authorization and settlement system 204 are controlled by a user through interactions with the one or more objects.

Card management and fulfillment system 206 allows health services providers 106A through 106N to receive new and replacement prepaid cards for electronic payments from insurance companies 104A through 104N. In one exemplary embodiment, card management and fulfillment system 206 can electronically track cards that are issued to health services providers and card processing terminals that are used by health services providers, such as to prevent a card from being used at an unauthorized terminal, and can provide other suitable electronic card management and fulfillment processes. In another exemplary embodiment, card management and fulfillment system 206 can provide a user interface control for selection of activation, processing, deactivation or other account features for card management and fulfillment, such as by using one or more objects having graphical, data and operational attributes, where the functional components of card management and fulfillment system 206 are controlled by a user through interactions with the one or more objects.

Reporting system 208 allows an insurance company 104A through 104N or health services providers 106A through 106N to receive electronic reports, such as report files containing data for payments made through an electronic prepaid card system on claims that have been submitted, electronic database correlations to explanations of benefits, or other suitable data. In another exemplary embodiment, reporting system 208 can provide a user interface control for selection of activation, processing, deactivation or other account features for reporting, such as by using one or more objects having graphical, data and operational attributes, where the functional components of reporting system 208 are controlled by a user through interactions with the one or more objects.

In operation, system 200 allows a prepaid card to be provided to health services providers, such as using credit card network 112 or in other suitable manners, so that insurance companies 104A through 104N can make electronic payments to health services providers 106A through 106N using a prepaid card instead of a check, in conjunction with an electronic payment network. System 200 thus facilitates payment of health services providers by insurance companies, and electronically coordinates such payments with access to online data regarding such payments to allow the health services providers to readily determine discrepancies in payment amounts or to resolve other problems.

Figure 3:
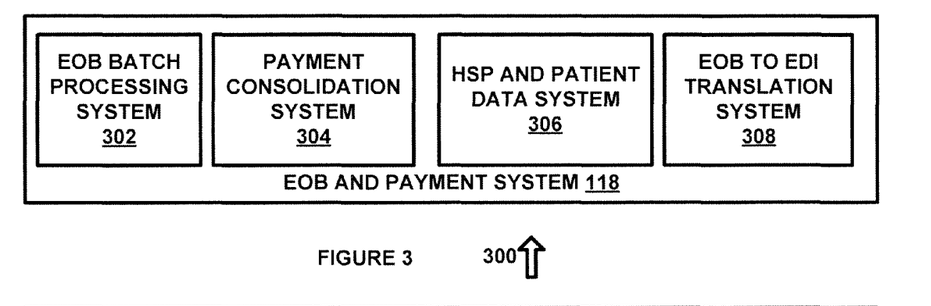
FIG. 3 is a diagram of a system for explanation of benefit and payment processing in accordance with an exemplary embodiment of the present invention.

FIG. 3 is a diagram of a system 300 for explanation of benefit and payment processing in accordance with an exemplary embodiment of the present invention. System 300 includes EOB and payment system 118 and EOB batch processing system 302, payment consolidation system 304, HSP and patient data system 306, and EOB to EDI translation system 308, each of which can be implemented in hardware or a suitable combination of hardware and software, and which can be one or more software systems operating on a general purpose processing or server platform. In one exemplary embodiment, system 300 can be implemented as one or more user controls operating on a user interface device, such as a graphic user interface operating on a display device of a general purpose computing platform or other suitable computing platform, a touch screen interface, or other suitable interface devices.

EOB batch processing system 302 receives electronic data in batch format from insurance companies that is used to generate explanation of benefit statements for patients and health services providers. In one exemplary embodiment, the electronic data can be in a proprietary format that is used by insurance companies with existing service providers that process the data to send out paper statements and checks. In another exemplary embodiment, a standardized data format such as based on the EDI data definitions or other suitable standards can be used. EOB batch processing system 302 can electronically consolidate data for health services providers, patients and other suitable parties. In another exemplary embodiment, EOB batch processing system 302 can provide a user interface control for selection of activation, processing, deactivation or other account features for EOB batch processing, such as by using one or more objects having graphical, data and operational attributes, where the functional components of EOB batch processing system 302 are controlled by a user through interactions with the one or more objects.

Payment consolidation system 304 can generate electronic payment data from insurance companies 104A through 104N and can electronically consolidate the payment for each of a plurality of health services providers 106A through 106N. In another exemplary embodiment, payment consolidation system 304 can electronically consolidate all payments from each insurance company 104A through 104N into a single payment, where the payment data is associated with data that can be accessed by a health services provider regarding the payment for each separate service payment. In another exemplary embodiment, payment consolidation system 304 can provide a user interface control for selection of activation, processing, deactivation or other account features for payment consolidation, such as by using one or more objects having graphical, data and operational attributes, where the functional components of payment consolidation system 304 are controlled by a user through interactions with the one or more objects.

HSP and patient data system 306 allows a health services provider and patient to electronically access data pertaining to each entity, such as using a web browser graphic user interface over a communications medium. In one exemplary embodiment, HSP and patient data system 306 can allow health services providers to electronically access explanation of benefit data for patients, can allow a patient to electronically access their individual explanation of benefits data, or can perform other suitable functions. For example, HSP and patient data system 306 can send a PDF data file of an explanation of benefits statement to a patient, health services providers can define data fields for customized electronic data reports for a plurality of patients, or other suitable functions can be provided. In another exemplary embodiment, HSP and patient data system 306 can provide a user interface control for selection of activation, processing, deactivation or other account features for HSP and patient data processing, such as by using one or more objects having graphical, data and operational attributes, where the functional components of authorization and settlement system 204 are controlled by a user through interactions with the one or more objects.

FOB to EDI translation system 308 allows electronic explanations of benefits data to be translated to electronic data interchange data formats in accordance with existing electronic data interchange format standards, such as using field definitions that are identified in the electronic data interchange standards FOB to EDI translation system 308 thus allows individual insurance company proprietary data formats for explanations of benefits to be translated through a centralized switch, and also allows additional data fields to be electronically converted from an EOB format to an EDI format where allowed, such as comment fields or other suitable fields. In another exemplary embodiment, EOB to EDI translation system 308 can provide a user interface control for selection of activation, processing, deactivation or other account features for EOB to EDI translation, such as by using one or more objects having graphical, data and operational attributes, where the functional components of EOB to EDI translation system 308 are controlled by a user through interactions with the one or more objects.

In operation, system 300 allows EOB and payment processing to be performed by centralized insurance services platform, so as to facilitate payment of health services providers from a plurality of insurance companies using a prepaid card system, a closed loop system, or in other suitable manners.

Figure 4:
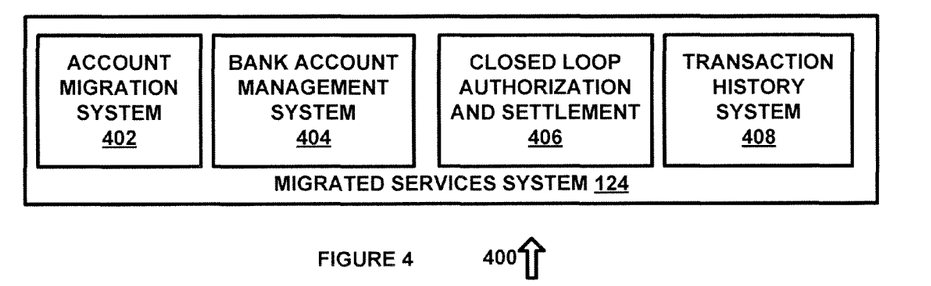
FIG. 4 is a diagram of a system for electronically migrating services from a prepaid card system to a closed loop system in accordance with an exemplary embodiment of the present invention.

FIG. 4 is a diagram of a system 400 for electronically migrating services from a prepaid card system to a closed loop system in accordance with an exemplary embodiment of the present invention. System 400 includes migrated services system 124 and account migration system 402, bank account management system 404, closed loop authorization and settlement 406 and transaction history system 408, each of which can be implemented in hardware or a suitable combination of hardware and software, and which can be one or more software systems operating on general purpose processing server platform. In one exemplary embodiment, system 400 can be implemented as one or more user controls operating on a user interface device, such as a graphic user interface operating on a display device of a general purpose computing platform or other suitable computing platform, a touch screen interface, or other suitable interface devices.

Account migration system 402 allows an existing prepaid card system electronic account for a health services provider to be migrated to a closed loop electronic account. In one exemplary embodiment, when a health services provider decides to migrate from a prepaid card electronic account to a closed loop electronic account, it may be necessary to deactivate the health services provider's electronic prepaid card account, and to establish automated clearing house or other suitable bank electronic account information for the health services provider to allow the health services provider to be paid electronically by the insurance services platform. For example, inter-bank or intra-bank electronic fund transfers using the ACH can be accomplished if the account data for the insurance company and health services provider bank accounts is known, and if suitable authorization has received. In this exemplary embodiment, the insurance company and health services provider can enter into a contractual agreement with the insurance services platform provider that defines the rights and responsibilities of the parties in regards to authorization and settlement of electronic transactions for health care services. In another exemplary embodiment, account migration system 402 can provide a user interface control for selection of activation, processing, deactivation or other account features for account migration, such as by using one or more objects having graphical, data and operational attributes, where the functional components of account migration system 402 are controlled by a user through interactions with the one or more objects.

Bank account management system 404 allows bank electronic accounts for insurance companies 104A through 104N and health services providers 106A through 106N to be centrally managed. In one exemplary embodiment, bank account management system 404 allows prepaid spending electronic accounts or flexible spending electronic accounts to be coordinated with payment of co-pays by patients, electronic reimbursement of co-pays to patients, or other suitable electronic data processing for patients. Bank account management system 404 allows bank electronic accounts associated with insurance companies, health services providers, patients and other suitable entities to be identified and managed, such as to ensure that only authorized payments are made to bank electronic accounts and that authorization is received for transfer of payments from bank electronic accounts. In another exemplary embodiment, bank account management system 404 can provide a user interface control for selection of activation, processing, deactivation or other account features for bank account management, such as by using one or more objects having graphical, data and operational attributes, where the functional components of bank account management system 404 are controlled by a user through interactions with the one or more objects.

Closed loop authorization and settlement 406 provides predetermined electronic authorization and settlement processes for claims made by health services providers to insurance companies. In one exemplary embodiment, a health services provider 106A through 106N can contact an insurance company 104A through 104N through insurance services platform 102, or can use existing processes to request authorization of a charge by a patient. Closed loop authorization and settlement 406 can either receive such authorization data electronically from the insurance company or a third party, or can otherwise process the authorization. Likewise, when a health services provider 106A through 106N requests payment for services that have been provided to a patient, insurance companies 104A through 104N can electronically coordinate with the health services provider through closed loop authorization and settlement 406, either by allowing closed loop authorization and settlement 406 to provide all electronic closed loop services, or in combination with data received from third-party sources, such as insurance companies 104A through 104N. In another exemplary embodiment, closed loop authorization and settlement 406 can provide a user interface control for selection of activation, processing, deactivation or other account features for closed loop authorization and settlement, such as by using one or more objects having graphical, data and operational attributes, where the functional components of closed loop authorization and settlement 406 are controlled by a user through interactions with the one or more objects.

Transaction history system 408 allows transaction history data to be electronically stored for closed loop transactions. In one exemplary embodiment, transaction history system 408 can take the place of electronic transaction data storage by credit card network 112 or other suitable transaction data, can provide consolidated electronic transaction data storage for insurance companies 104A through 104N and health services providers 106A through 106N, or can provide other suitable functions. In this exemplary embodiment, transaction history system 408 eliminates redundancies in electronic data storage systems from insurance companies 104A through 104N and health services providers 106A through 106N. In another exemplary embodiment, transaction history system 408 can provide a user interface control for selection of activation, processing, deactivation or other account features for transaction history data, such as by using one or more objects having graphical, data and operational attributes, were the functional components of transaction history system 408 are controlled by a user through interactions with the one or more objects.

In operation, system 400 allows health services providers to migrate from an electronic prepaid card system format to an electronic closed loop format, so as to reduce the amount of transaction processing that is required and the associated fees for payments made to health services providers by insurance companies. For example, it is not uncommon for credit card networks 112 to charge fees of several percent of the amount of the transaction for processing of a prepaid card. Likewise, funds that are electronically stored in a prepaid card account may be subject to default or may otherwise be lost or forfeited if a prepaid card is lost or not processed in a timely manner. System 400 provides for a secure electronic environment and cost-effective processing of payments to health services providers by insurance companies.

Figure 5:
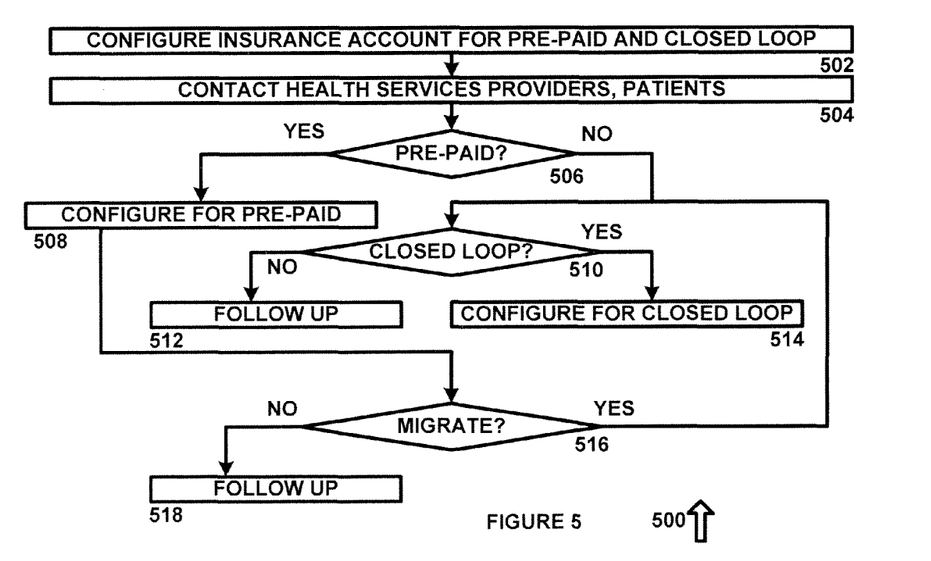
FIG. 5 is a flowchart of an algorithm for configuring payment processing in accordance with an exemplary embodiment of the present invention.

FIG. 5 is a flowchart of an algorithm 500 for configuring payment processing in accordance with an exemplary embodiment of the present invention. Algorithm 500 can be implemented in software operating on a general purpose processing or server platform so as to convert the general purpose platform into a special purpose machine, or in other suitable embodiments. Algorithm 500 can be implemented with one or more objects, each having associated data, graphical and functional attributes, so as to generate user interface controls on a graphical user interface of a general purpose processor, a touch screen interface or in other suitable manners.

Algorithm 500 begins at 502 where an insurance electronic account is configured for prepaid and closed loop account processing. In one exemplary embodiment, an electronic account associated with an insurance company may have plurality of insurance health services providers that can be paid by an insurance services platform for a plurality of patients, and the payment can be made through a prepaid card, a closed loop system, or in other suitable manners. At 502, the electronic account for the insurance company is configured for handling of such payments, such as to allow the insurance company to electronically submit explanation of benefits data and payment authorization data, and to allow the insurance services platform to make electronic payments to health services providers as authorized by the insurance companies. In one exemplary embodiment, EOB data files, EDI data files or other suitable data files that contain data fields that identify the plurality of health services providers, patients or other suitable parties can be received from insurance companies, and accounts for the health services providers, patients and other suitable parties can be automatically created using these data fields, such as such as name fields, account number fields, address fields, social security number fields, telephone number fields and other suitable fields.

The algorithm then proceeds to 504 where health services providers, patients or other suitable parties are contacted. In one exemplary embodiment, the health services providers, patients or other parties can be contacted electronically, through the mail, directly by insurance companies, on behalf of insurance companies, or in other suitable manners, such as to provide them with account identification and access information, to prompt them to opt in or to opt out of account access, or for other suitable purposes. The algorithm then proceeds to 506.

At 506 it is determined whether the health services provider has opted to receive a prepaid card for electronic payment reimbursement of payments for claims made by patients or on behalf of patients, such as by electronically prompting a health services provider to make a selection. If it is determined that a prepaid card has been selected by the health services provider, the method proceeds to 508 where the health services provider's electronic account is configured to receive payments through a prepaid card. In one exemplary embodiment, the health services provider can be issued a prepaid card for use with an individual insurance company, for use with any insurance company associated with the insurance services platform, or in other suitable manners. The method then proceeds to 516. Likewise, if it is determined that no prepaid option has been selected 506, the method proceeds to 510.

At 510, is determined whether a closed loop selection has been made, such as by electronically prompting a user to enter data that indicates whether the user has accepted or declined a closed loop option. If it is determined that closed loop processing has not been selected, the algorithm proceeds to 512 where the health services provider is tagged for follow-up, such as by electronically storing data in a calendar tool for alerting a user to contact the health services provider. Otherwise, the method proceeds to 514 where the electronic account for the health services provider is configured to receive closed loop processing. In one exemplary embodiment, the closed loop processing can include configuring ACH automated clearinghouse data for a health services provider's electronic account, and can also include receiving electronic confirmation that a health services provider has agreed to be bound by contractual terms for handling disputes regarding payments or other suitable data.

At 516, it is determined whether a health services provider has made a decision to migrate from a prepaid electronic account to a closed loop electronic account. If it is determined that no such decision has been made, such as if a health services provider responds to a query invitation to migrate with a "no" data entry, the algorithm proceeds to 518 where the health services provider's electronic account is tagged for follow-up in the future, such as by email, personal call, or in other suitable manners. Likewise, if it is determined at 516 that a health services provider does want to migrate their electronic account from a prepaid electronic account to a closed loop electronic account, the algorithm returns to 510.

In operation, algorithm 500 allows an insurance services platform to offer electronic prepaid and closed loop claims and payment processing to health services providers for or on behalf of insurance companies. Algorithm 500 allows the insurance services platform to act as a switch for authorization of claims and services, and to use an existing credit card network 112 or closed loop processing to accomplish electronic payment of health services providers by insurance companies.

Figure 6:
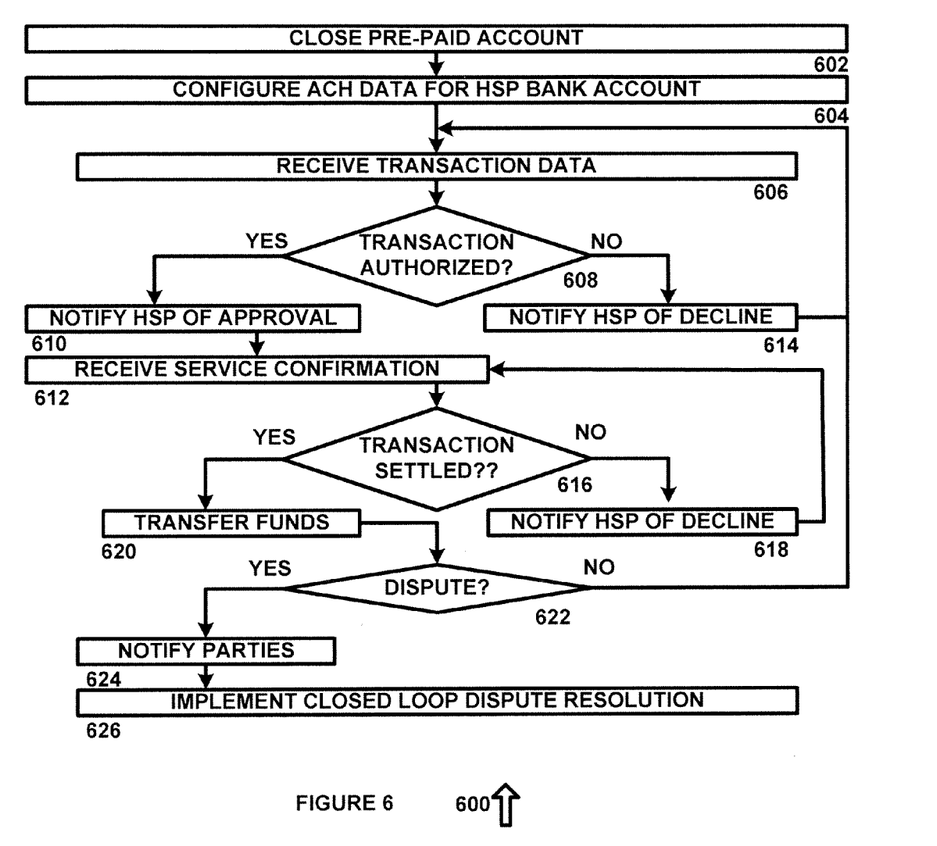
FIG. 6 is a flowchart of an algorithm for electronically migrating a health services provider from a prepaid card to a closed loop electronic account and for electronically processing transactions in accordance with an exemplary embodiment of the present invention.

FIG. 6 is a flowchart of an algorithm 600 for electronically migrating a health services provider from a prepaid card to a closed loop electronic account and for electronically processing transactions in accordance with an exemplary embodiment of the present invention. Algorithm 600 can be implemented in software operating on a general purpose processing or server platform so as to convert the general purpose platform into a special purpose machine, or in other suitable embodiments. Algorithm 600 can be implemented with one or more objects, each having associated data, graphical and functional attributes, so as to generate user interface controls on a graphical user interface of a general purpose processor, a touch screen interface or in other suitable manners.

Algorithm 600 begins at 602 where a prepaid electronic account is closed. In one exemplary embodiment, a card associated with a prepaid electronic account can be deactivated, the master electronic account for the prepaid cards can be updated to reflect that the card has been closed, or other suitable processes can be performed. The algorithm then proceeds to 604.

At 604, automated clearinghouse data is configured for each health services provider bank electronic account. In one exemplary embodiment, when a health services provider migrates from a prepaid electronic account to a closed loop electronic account, the health services provider can provide a bank electronic account routing number and other suitable data to allow payment to be electronically made to the health services provider. Once the automated clearinghouse data for the health services provider bank electronic account is configured, the algorithm proceeds to 606.

At 606, transaction data is received. In one exemplary embodiment, the transaction data can include an electronic request from a health services provider for authorization to provide medical services to a patient, or other suitable data. If it is determined that the transaction is authorized, the algorithm proceeds to 610 where the health services provider is notified of approval. Otherwise, the algorithm proceeds to 614 where the health services provider is electronically notified of the decline. The algorithm can then return to 606, where the health services provider can provide new transaction data, such as to reformat data in required format, to provide new transaction request data, or for suitable functions.

After a health services provider receives approval at 610, the algorithm proceeds to 612 where service confirmation is electronically received, such as by transmitting data to an insurance company or in other suitable manners. Service confirmation data can include information regarding the services that were performed on the patient, identification data for the patient such as electronic biometric data, and other suitable data. The algorithm then proceeds to 616.

At 616, it is electronically determined whether the transaction has settled. In one exemplary embodiment, an insurance company can review the service confirmation data and other suitable data and can determine whether or not the payment should be made for the transaction. If it is determined that the transaction should not be settled, the algorithm proceeds to 618 and the health services provider is electronically notified of the decline. For example, if the electronic biometric data does not match stored electronic biometric data for a patient, the health services provider can be contacted to alert them of potential fraud. The health services provider can then contact the insurance company or otherwise resubmit data to request service confirmation and transaction settlement. Likewise, if it is determined at 616 that the transaction has settled, such as by electronically receiving a confirmation or settlement authorization from an insurance company, the algorithm proceeds to 620.

At 620, funds are transferred to the health services provider's bank electronic account from the insurance company's bank electronic account. In one exemplary embodiment, the transfer of funds can take place once a day in batch form, can be subject to automated clearinghouse rules, can be subject to other contractual provisions agreed to by the parties, or can use other suitable processes. The algorithm then proceeds to 622.

At 622, it is determined whether a transaction has been electronically disputed. In one exemplary embodiment, a health services provider can dispute an amount of payment, an insurance company can dispute whether services have been provided as represented by the health services provider, or other suitable data can be electronically provided to initiate a dispute. If a dispute has not been initiated at 622 the method returns to 606. Otherwise, the algorithm proceeds to 624 whether the parties are notified of the dispute, the status of the dispute and the reason for the dispute. The algorithm then proceeds to 626 where a closed loop dispute resolution process is implemented. In one exemplary embodiment, the parties can be required to agree to closed loop dispute resolution processes to facilitate timely and inexpensive resolution of any disputes regarding whether services were provided, whether payment was made, or other disputes. For example, a patient may contact an insurance company and notify the insurance company that the patient did not receive the services that were provided, such as where the patient's identity has been stolen. In this event, the patient may dispute a charge and dispute resolution processes at 626 may determine that the health services provider did not obtain positive identification of the data or other suitable data.

In operation, algorithm 600 allows a prepaid electronic account to be migrated to a closed loop electronic account and provides for closed loop transaction processing of healthcare claims or health services provided to patients and claims made to insurance companies. Algorithm 600 thus facilities the rapid payment and processing authorization of claims, and can help to prevent fraudulent claim activity.

Figure 7:
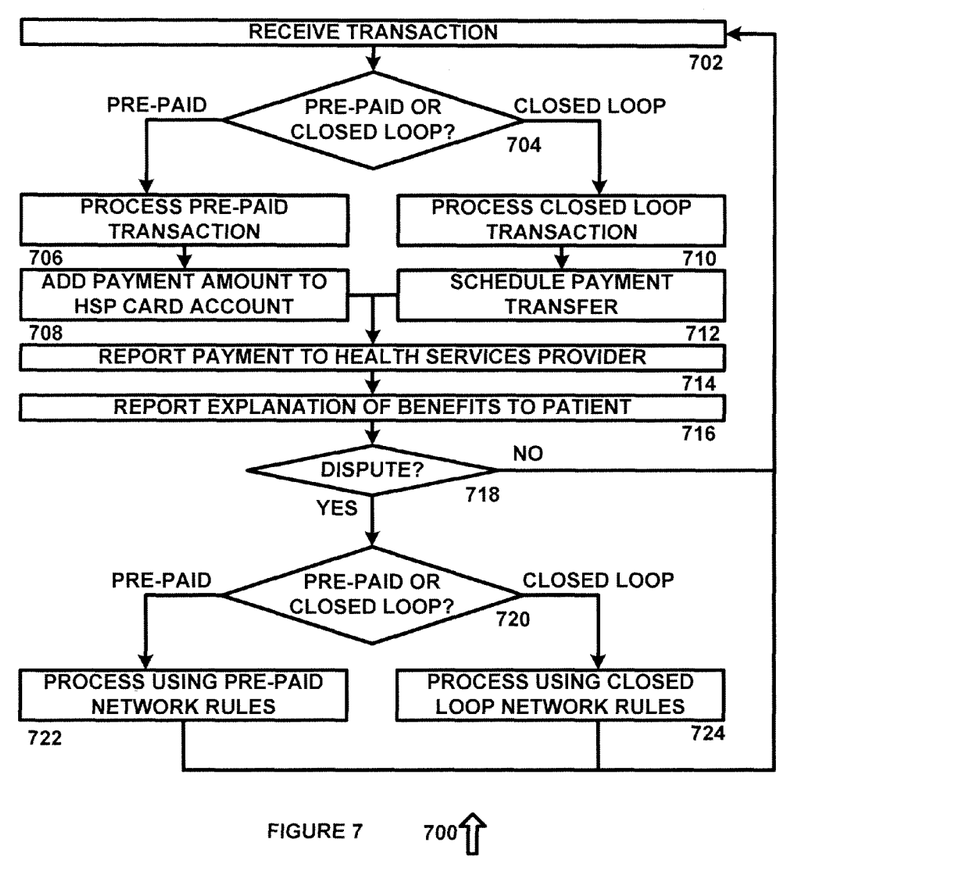
FIG. 7 is a flow chart of an algorithm for pre-paid and closed loop processing in accordance with an exemplary embodiment of the present invention.

FIG. 7 is a flow chart of an algorithm 700 for pre-paid and closed loop processing in accordance with an exemplary embodiment of the present invention. Algorithm 700 allows pre-paid and closed loop processing to be combined for processing of health services payments by using common functionality for reporting and payment processing where possible, and separate functionality where needed. Algorithm 700 can be implemented in software operating on a general purpose processing or server platform so as to convert the general purpose platform into a special purpose machine, or in other suitable embodiments. Algorithm 700 can be implemented with one or more objects, each having associated data, graphical and functional attributes, so as to generate user interface controls on a graphical user interface of a general purpose processor, a touch screen interface or in other suitable manners.

Algorithm 700 begins at 702, where an electronic transaction is received. In one exemplary embodiment, the transaction can be received from an insurance company, such as where the electronic transaction data includes explanation of benefits data, payment data and other suitable data. In another exemplary embodiment, the electronic transaction can include data from a health services provider and an insurance company, such as a request for authorization to provide services, approval from the insurance company, a request for settlement of services from the health services provider, an explanation of benefits data, payment data and other suitable data from the insurance company, or other suitable data. The algorithm then proceeds to 704.

At 704, it is determined whether pre-paid or closed loop processing is required, such as by electronically determining from the data record that has been received whether the available data fields define a pre-paid or closed loop transaction, by determining whether a transaction type flag defines the transaction pre-paid or closed loop transaction, or in other suitable manners. In one exemplary embodiment, the transaction data can be received at a switch that is configured to process pre-paid or closed loop transaction data. If it is determined that pre-paid transaction processing is required, the algorithm proceeds to 706, otherwise the algorithm proceeds to 710.

At 706, the pre-paid transaction data is processed, such as by determining an associated pre-paid account for the health services provider, by configuring a new pre-paid account for a health services provider that does not have an existing pre-paid account, or in other suitable manners. The algorithm then proceeds to 708, where a payment amount is added to the pre-paid card account for the health services provider. In one exemplary embodiment, the health services provider can have a separate pre-paid card account for each different insurance provider, and the payment amount can be added to an available balance on that pre-paid card, such as by transferring funds from a general account for that insurance company to the pre-paid card account for the health services provider. In another exemplary embodiment, the health services provider can have a single pre-paid card account for use with each different insurance provider, and the payment amount can be added to an available balance on that pre-paid card, such as by transferring funds from a separate account for that insurance company to the pre-paid card account for the health services provider. Other suitable processes can also or alternatively be used. The algorithm then proceeds to 714.

At 710, the transaction is processed as a closed loop transaction, such as where the insurance company and the health services provider have both given ACH account access to an insurance services provider, so as to allow the insurance services provider to schedule payments using the ACH network or in other suitable manners. The algorithm then proceeds to 712, where a payment transfer is scheduled. In one exemplary embodiment, the payment transfers can be scheduled on a periodic basis, when an amount of payments reaches a predetermined amount, when a number of transactions reaches a predetermined amount, or in other suitable manners. The algorithm then proceeds to 714.

At 714, payment is electronically reported to the health services provider. In one exemplary embodiment, the report can be made to alert the health services provider that funds have been added to a pre-paid card, that an ACH transfer has been made, or to provide other suitable data. The algorithm then proceeds to 716, where explanation of benefits data is reported to a patient. In one exemplary embodiment, the patient can receive an electronic or paper report that identifies how much the health services provider was paid for each service, services that the health services provider was not paid for, whether a health savings account was used to pay for a co-pay or deductible, or other suitable data. The algorithm then proceeds to 718.

At 718, it is determined whether a dispute has been reported. In one exemplary embodiment, the insurance provider or the patient can electronically dispute a payment to a health services provider, such as when a patient reports that they did not receive the reported services in an explanation of benefits statement. Other suitable data can also be used to initiate a dispute. If it is determined that a dispute has not been reported, the algorithm returns to 702. Otherwise, the algorithm proceeds to 720.

At 720, it is determined whether the disputed transaction was a pre-paid or a closed loop transaction. If it is determined that the disputed transaction was a pre-paid transaction, the algorithm proceeds to 722 where the dispute is processed in accordance with pre-paid card network rules. In one exemplary embodiment, a pre-paid card network such as a VISA or MasterCard pre-paid card may define the conditions under which disputes should be handled, such as the time limit for reporting a dispute, each party's responsibility when a dispute is reported, or other suitable rules. The algorithm then returns to 702.

If it is determined at 720 that the disputed transaction was a closed loop transaction, the algorithm proceeds to 724 where the dispute is processed in accordance with closed loop transaction rules. In one exemplary embodiment, the insurance services provider may define the conditions under which disputes should be handled, such as the time limit for reporting a dispute, each party's responsibility when a dispute is reported, or other suitable rules, and the parties can be required to agree to such rules contractually as a condition to allowing the parties to receive closed loop processing of transactions, such as in exchange for lower transaction processing fees. The algorithm then returns to 702.

In operation, algorithm 700 allows transactions to be processed in a network where the transactions are either pre-paid or closed loop. Algorithm 700 supports either type of transaction processing, so as to allow parties to easily migrate from pre-paid processing to closed loop processing, and for other suitable purposes.

Figure 8:
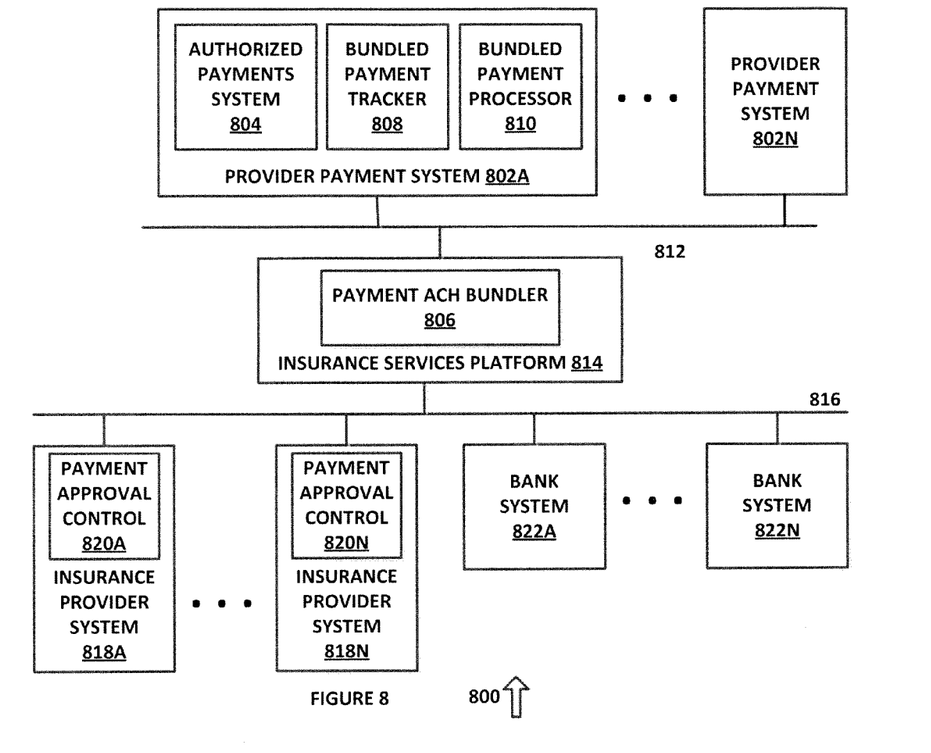
FIG. 8 is a diagram of a system for post-authorization transaction bundling in accordance with an exemplary embodiment of the present disclosure.

FIG. 8 is a diagram of a system 800 for post-authorization transaction bundling in accordance with an exemplary embodiment of the present disclosure. System 800 can be implemented in hardware or a suitable combination of hardware and software, and can be one or more software systems operating on one or more general purpose processing systems.

System 800 includes provider payment systems 802A through 802N, each of which includes authorized payments system 804, bundled payment tracker 808 and bundled payment processor 810. Provider payment systems 802A through 802N can be operated by a health services provider, such as a doctor's office, a hospital, a clinic or other suitable health services providers. Provider payment systems 802A through 802N can be used to obtain approval for medical procedures (such as from an insurance company), to submit medical expenses for authorization and payment, or to perform other suitable functions, such as in conjunction with health services providers 106A through 106N.

Insurance services platform 814 interfaces with provider payment systems 802A through 802N, and can be used to receive data from or to provide data to provider payment systems 802A through 802N, to perform processing in conjunction with insurance service platform 102, or to perform other suitable functions. Insurance services platform 814 further includes payment ACH bundler 806.

Insurance provider systems 818A through 818N each include payment approval control 820A through 820N, respectively, and can be operated by insurance providers, such as to interface with insurance services platform 814, provider payment systems 802A through 802N or other suitable systems.

Authorized payments system 804 transmits payment request data and receives authorized payment data from insurance provider systems 818A through 818N and generates user interface data to allow a user to review and select further processing operations for payment request data and authorized payment data. In one exemplary embodiment, a user of one of provider payment systems 802A through 802N can generate payment request data for one or more medical expenses, such as a doctor's office visit, a medical procedure, a diagnostic test, a medical treatment, dispensing of medical devices or compounds, or other suitable expenses. The payment request data can include separate line items with industry standard codes for different categories of expenses (such as doctor's time, diagnostic tests, supplies) and is transmitted to one or more of insurance provider systems 818A through 818N through insurance services platform 814, such as by determining the insurance services provider associated with a patient, by determining an electronic or physical address associated with the insurance services provider, by determining data requirements for the payment request data as a function of the associated insurance services provider and assembling the required data into a request data packet or packets that meets the insurance services provider's data requirements, or in other suitable manners. After the payment request data is received and processed by the associated insurance provider system 818A through 818N, authorized payment data is generated and transmitted back to the associated provider payment system 802A through 802N. In this manner, each provider payment system 802A through 802N can receive authorized payment data from one or more of insurance provider systems 818A through 818N. However, each provider payment system 802A through 802N would typically receive the authorized payment data from multiple insurance provider system 818A through 818N at different times. For example, on a given day, a provider may generate payment request data for hundreds of patients, and the payment request data can be transmitted to dozens of different insurance provider systems 18A through 818N. Each of the insurance provider systems 818A through 818N may generate authorized payment data at different times, and may process some or all of the payment request data for a given patient at that time. As such, management of the authorized payment data can be difficult, because the provider will want to process the authorized payments as soon as possible, but also needs to be able to determine the authorization and payment status for each patient. System 800 provides for simplified processing and management of such authorized payment data, as described herein.

Payment ACH bundler 806 allows authorized payments to be bundled into a single ACH payment request, and associates a unique tracking number with the request. In one exemplary embodiment, payment ACH bundler 806 can receive payment request data from authorized payments system 804 for each of a plurality of unrelated patients and can bundle the authorized payments associated with some or all of the payment request data into a single ACH payment request. In this exemplary embodiment, an ACH payment request can include an amount to be transferred, one or more bank systems 822A through 822N from which the amount is to be transferred from, one or more bank systems 822A through 822N to which the amount is to be transferred to, and associated account and authorization data that is used to facilitate the ACH funds transfer.

Bundled payment tracker 808 allows bundled ACH payment requests to be managed by a user. In one exemplary embodiment, a single ACH payment request can include a plurality of separate associated transactions to a plurality of different banks or other financial institutions, and each of these separate transactions may be separately authorized for ACH funds transfer. For example, some requests may be denied due to formatting errors, some request may be denied due to authorization errors, some requests may be denied due to insufficient funds, and the remaining request might be approved and funds transferred. In this exemplary embodiment, bundled payment tracker 808 allows a user to track the status of a bundled ACH payment request, such as to allow unauthorized transactions to be resubmitted, to track the status of individual transactions or bundled ACH payment requests, or in other suitable manners.

Bundled payment processor 810 allows bundled ACH payments to be subsequently processed as needed. In one exemplary embodiment, a provider payment system 802A through 802N can be used to process payments for two or more medical services providers, such as doctors, laboratories, equipment providers or other suitable service providers. When payments are received from insurance companies at a provider payment system 802A through 802N, the associated provider payment system 802A though 802N will need to transfer the funds to the associated medical services provider. Bundled payment processor 810 allows payments to medical services providers to be reconciled with payment request data generated by authorized payments system 104, tracks payments and provides other suitable functionality.

Insurance services platform 814 receives funds or payment from bank systems 822A through 822N in response to transfer instructions from insurance provider systems 818A through 818N, and bundles the funds into a single ACH transfer to each of provider payment systems 802A though 802N, in addition with an associated bundled payment identifier. In this manner, insurance services platform 814 can consolidate a plurality of different payments from different insurance provider systems 818A through 818N to a plurality of different individual provider payment systems 802A through 802N. For example, if there are ten insurance provider systems 818A through 818N, and each are making a separate payment to ten different provider payment systems 802A though 802N, then 100 different ACH transfers would need to be scheduled. Using system 800, only 20 different ACH transfers would be needed—10 ACH transfers corresponding to one transfer from each of the 10 insurance provider systems 818A through 818N, and 10 ACH transfers corresponding to one transfer from insurance services platform 814 to each of the 10 provider payment systems 802A though 802N.

Payment approval controls 820A through 820N allow operators at associated insurance provider systems 818A through 818N to review payment request data from provider payment systems 802A through 802N and to generate authorized payment data in response. In one exemplary embodiment, payment approval controls 820A through 820N can generate a list of sets of payment request data and can allow a user to review each set of payment request data and to generate authorized payment data for the associated payment request data. In this exemplary embodiment, payment approval controls 820A through 820N can further generate a user display showing the amount of funds that need to be made available in response to payment request data, such as to allow the user to process a plurality of sets of payment request data, to determine a total amount of funds that need to be available to cover payment associated with authorization of the payment request data, and to ensure that funds are available in an associated bank account after transmission of authorized payment data, such as to allow the amount of available funds to be managed to reduce risk of loss or for other suitable purposes.

In operation, system 800 allows a health services provider, which may have a plurality of associated medical services providers, to manage payment requests to insurance companies, receipt of funds from insurance companies in response to payment requests and distribution of funds to medical services providers after receipt. System 800 allows bundled ACH requests to be generated to facilitate the ease of tracking payment requests, accounting and other data management functions.

Figure 9:
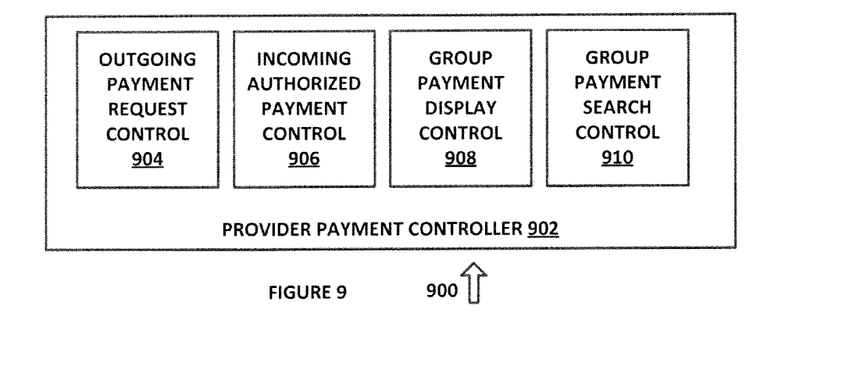
FIG. 9 is a diagram of a system for a provider payment controller in accordance with an exemplary embodiment of the present disclosure.

FIG. 9 is a diagram of a system 900 for a provider payment controller in accordance with an exemplary embodiment of the present disclosure. System 900 can be implemented in hardware or a suitable combination of hardware and software, and can be one or more user controls operating on a user interface device, such as a graphic user interface operating on a display device of a general purpose computing platform or other suitable computing platform, a touch screen interface, or other suitable interface devices.

System 900 includes provider payment controller 902, which includes outgoing payment request control 904, incoming authorized payment control 906, group payment display control 908 and group payment search control 910, each of which can be implemented as one or more objects having associated data, graphical and functional attributes or in other suitable manners. Provider payment controller 902 can be a web-based services portal that allows a user to log on to an account for a health services provider using a web browser, a thin client or other suitable systems. After logging into provider payment controller 902, outgoing payment request control 904, incoming authorized payment control 906, group payment display control 908 and group payment search control 910 having data, graphical and functional attributes for the associated health services provider can be generated, such as by using one or more user-selectable controls.

Outgoing payment request control 904 generates user controls that allows outgoing payment requests to be submitted to third parties, such as insurance service providers. In one exemplary embodiment, a claim for medical services that have been provided to a patient can be generated that itemizes the goods and services that have been provided according to industry standardized codes. The claim can then be submitted to an insurance services provider, such as through an insurance services platform. The claim can be assigned a unique identifier for tracking or other suitable information, and outgoing payment request control 904 can be used to locate the claim, to check the payment status for the claim and to perform other suitable functions.

Incoming authorized payment control 906 allows a user to review incoming authorized payments associated with outgoing payment requests. In one exemplary embodiment, incoming authorized payment control 906 can generate a list of approved claims that are available for payment, and can allow a user to select individual claims to view additional details related to the claim, to approve one or more claims for payment, to disapprove one or more claims for payment, or to otherwise control subsequent payment on the claims. In this exemplary embodiment, incoming authorized payment control 906 can be used in conjunction with a payment card and payment card reader, where the user reads the payment card that is associated with a provider payment system using the payment card reader in order to initiate a transfer of funds to an account that is associated with the payment card, where funds are transferred by electronic funds transfer (EFT), automated clearing house (ACH) or in other suitable manners to a bank account associated with the payment card. Likewise, funds can be transferred without individual user review of each claim, such as based on account settings or other suitable data.

Group payment display control 908 displays a group number associated with a payment or fund transfer that has been performed using incoming authorized payment control 906 and related details. In one exemplary embodiment, groups of claims can be paid using a single EFT transfer, a single ACH transfer or in other suitable manners, including claims for unrelated patients, claims filed on different dates, or other suitable claims. In this exemplary embodiment, the details associated with a single payment for a group of claims can be reviewed, such as the date on which payment was made, the claims that were paid, the total amount of the payment, EFT/ACH transfer details or other associated data.

Group payment search control 910 allows a group payment to be located based on search criteria, such as one or more of the name associate with a claim, a claim number, a medical services provider associated with a claim, a group payment number or other suitable search criteria. In one exemplary embodiment, group payment search control 910 can be implemented by providing a group payment number associated with a record as one of a plurality of sortable fields, using a search engine with user-selectable fields, or in other suitable manners.

In operation, system 900 allows a health services provider to review claims and associated payment details, such as to determine whether a submitted claim has been paid, to review the claim and associated details or for other suitable purposes. Groups of unrelated payments can also be paid in a single EFT, ACH or other suitable transaction, in order to simplify payment processes.

Figure 10:
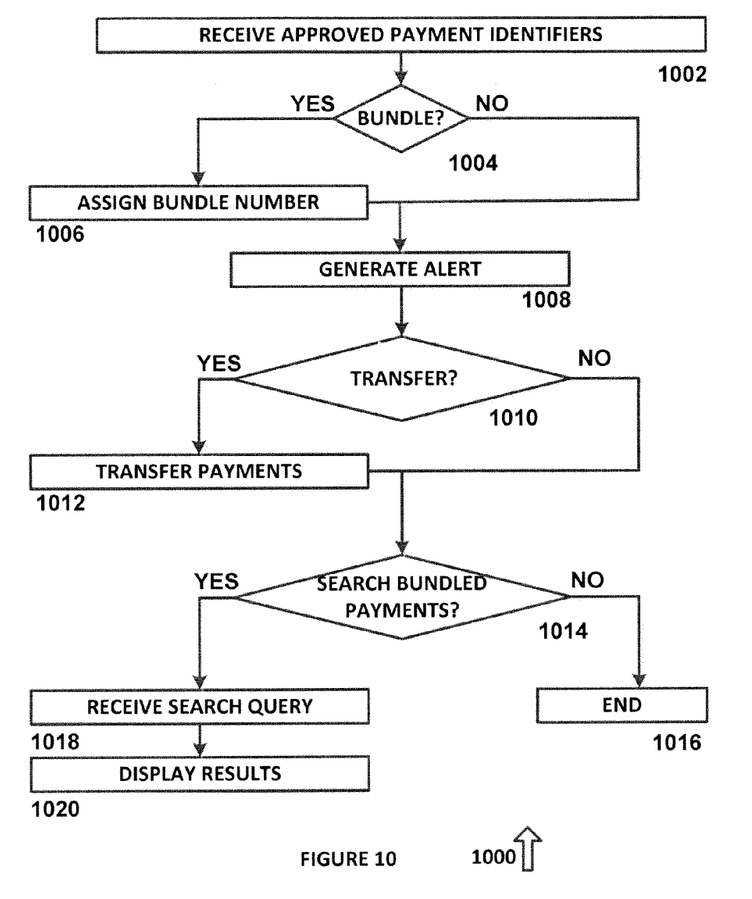
FIG. 10 is a diagram of an algorithm for a post-authorization transaction bundling control in accordance with an exemplary embodiment of the present disclosure.

FIG. 10 is a diagram of an algorithm 1000 for post-authorization transaction bundling control in accordance with an exemplary embodiment of the present disclosure. Algorithm 1000 can be implemented in hardware or a suitable combination of hardware and software, and can be implemented with one or more objects, each having associated data, graphical and functional attributes, so as to generate user interface controls on a graphical user interface of a general purpose processor, a touch screen interface or in other suitable manners.

Algorithm 1000 begins at 1002, where approved payment identifiers are received. In one exemplary embodiment, a web-based or thin client portal for a healthcare services provider that is hosted by an insurance services platform or other suitable systems can generate a user interface alert to notify a user that approved payments are available for review, so as to allow a user to select a user control to access a list of one or more approved payments for claims, transactions or other suitable records. In this exemplary embodiment, the insurance services platform can submit claims received from a plurality of healthcare services providers to a plurality of insurance companies, and can receive claim approval data, such as payment, an explanation of benefits or other suitable data. As one or more processed or adjudicated claims are received for a given healthcare services provider, the insurance services provider can generate notification data (such as an icon, an audible alert, a pop-up screen or display, or other suitable notification data) to alert an operator associated with the healthcare services provider that approved payments are available for review, such as by changing a state of an object associated with a user interface or in other suitable manners. The algorithm then proceeds to 1004.

At 1004, it is determined whether to bundle funds for two or more approved payments into a single fund transfer event. In one exemplary embodiment, a user can select one or more of the approved payment identifiers to enable or initiate funds transfer, such as by changing the state of a user control associated with the payment identifiers in a list (such as a check box in a user interface) or in other suitable manners. Likewise, the user can select one or more of the approved payment identifiers to inhibit or prevent funds transfer in a similar manner, all approved payments can be transferred based upon one or more user-selected conditions, such as after a predetermined period of time has elapsed or when a predetermined dollar threshold has been exceeded, or other suitable selections can be made to indicate that funds for two or more approved payments should be bundled. If bundling of funds has not been selected, the algorithm proceeds to 1008, otherwise, the algorithm proceeds to 1006, where a bundled payment number is assigned to each of the approved payments, such as by changing the value in an associated field for each data record to the bundled payment number. The algorithm then proceeds to 1008.

At 1008, an alert is generated if there are one or more bundled payments available for transfer. In one exemplary embodiment, the alert can be generated at an insurance services platform or in other suitable locations, such as where an operator at the insurance services platform must review and initiate any funds transfer requests. Likewise, the algorithm can proceed directly to 1010 if transfer is automated, if transfer of all funds at periodic intervals or based upon predetermined conditions has previously been selected, or in other suitable manners.

At 1010, it is determined whether transfer of funds has been approved. If not, the algorithm proceeds to 1014, otherwise, the algorithm proceeds to 1012 where transfer of funds is performed. In one exemplary embodiment, funds can be transferred using an EFT or ACH process, such as into a bank account associated with a payment card, into a predetermined bank account, or in other suitable manners. The algorithm then proceeds to 1014.

At 1014, it is determined whether bundled payments are to be searched, such as by selecting a user control to activate a search tool or in other suitable manners. If no search is to be performed, the algorithm proceeds to 1016 and terminates. Otherwise, the algorithm proceeds to 1018 where a search query is received, such as in one or more data entry fields of a search query control, by sorting one or more user-selectable fields, or in other suitable manners. The algorithm then proceeds to 1020, where the search is performed and the search results are displayed.

In operation, algorithm 1000 allows post authorization claims or other transactions to be bundled for subsequent fund transfers, in order to reduce the number of EFT, ACH or other fund transfers associated with making payments on claims or transactions, and also allows claims or transactions to be searched by a bundled payment number to locate associated claims or transactions, by a claim or transaction number in order to locate an associated bundled payment, or in other suitable manners.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A method for data processing comprising:
    generating an outgoing payment control object on a user interface of a processor using a data processor;
    receiving a user selection of one or more user-selectable data records for the outgoing payment request control object, each of the user-selectable data records having one or more associated fields;
    generating one or more graphical attributes for the outgoing payment request control object to allow the user-selectable data records to be displayed;
    receiving a selection of one or more functional attributes of the outgoing payment request control object to allow the user-selectable data records to be submitted for payment authorization by a third party;
    generating an incoming authorized payment control object having one or more authorized payment data records on the processor;
    generating one or more graphical attributes of the incoming authorized payment control object to allow the authorized payment data records to be displayed;
    receiving a selection of one or more functional attributes of the incoming authorized payment control object to allow the authorized payment data records to be submitted for fund transfer in a single bundled payment transaction;
    generating a group payment display control object having one or more associated group data records on the processor;
    generating one or more graphical attributes of the group payment display control object to allow the associated group data records to be displayed; and
    receiving a user selection of one or more functional attributes of the group payment display control object to allow the associated group data records to be displayed; and
    wherein the outgoing payment request control object and the incoming authorized payment control object are generated in a same user interface for a healthcare services provider.

2. The method for data processing of claim 1 further comprising:
    generating a group payment search control object having one or more associated search data records on the processor;
    generating one or more graphical attributes of the group payment search control object to allow the associated search data records to be displayed; and
    receiving a user selection of one or more functional attributes of the group payment search control object to allow the associated search data records to be searched.

3. The method for data processing of claim 1 further comprising:
    receiving the user-selectable data records from the outgoing payment request control object at an insurance service platform; and
    transmitting each of the user-selectable data records from the insurance platform to an insurance services provider associated with a patient identifier contained within the user-selectable data record.

4. The method for data processing of claim 3 further comprising generating a payment approval control object in said user interface of an insurance services provider, the payment approval control object having one or more associated approval data records, each of the associated approval data records having one or more associated fields, the payment approval control object having one or more graphical attributes to allow the associated approval data records to be displayed, the payment approval control object having one or more functional attributes to allow the associated approval data records to be approved or denied.

\* \* \* \* \*